Nov. 18, 1958 A. L. HOPPER 2,861,185

COMPENSATED PLATE TYPE LIMITER

Filed Jan. 27, 1956 2 Sheets-Sheet 1

INVENTOR
A. L. HOPPER
BY W. L. Keefauver
ATTORNEY

INVENTOR
A. L. HOPPER
BY W. L. Keefauver
ATTORNEY

United States Patent Office
2,861,185
Patented Nov. 18, 1958

2,861,185

COMPENSATED PLATE TYPE LIMITER

Andrew L. Hopper, Summit, N. J., assignor to Bell Telephone Laboratories, Incorporated, New York, N. Y., a corporation of New York Application January 27, 1956, Serial No. 561,896
6 Claims. (Cl. 250—27)

This invention relates to amplitude limiting of electrical waves and more particularly to amplitude limiting systems of the so-called plate limiting type. While the invention is of general application, it is particularly well adapted for use as an amplitude limiting device in a frequency modulation system and will be described by way of example in that connection.

It is an object of the present invention to increase the suppression in a plate type limiter.

Another object of the invention is to minimize extraneous level-to-phase conversion in amplitude limiters.

Ideally, a frequency modulation receiver should be responsive only to the frequency of the incoming signal and be totally nonresponsive to signal amplitude. To this end, frequency modulation receivers generally use an amplitude limiting system for reducing the undesirable effects of amplitude modulation introduced by noise interference or other signals during transmission. However, with the advent of high gain, wide band multiplex frequency modulation systems having many repeaters in tandem and employing, for example, traveling wave tube amplifiers, signals devoid of any amplitude modulation are necessary.

In addition to relatively long time period envelope amplitude variations present in a frequency modulated signal which may be removed by an automatic gain control system, instantaneous amplitude modulation introduced because of antenna, transmission line or wave guide irregularities, preamplifier or intermediate frequency amplifier nonlinearity, or other nonsymmetrical elements of the receiving system must be effectively eliminated to prevent its conversion to phase modulation. Once amplitude modulation is converted to phase modulation, which is indistinguishable from frequency modulation, it becomes extremely difficulty to eliminate. When passed through the system along with the desired signal, such an undesired signal will contribute to intermodulation noise. It is obvious therefore, that if an amplitude limiting system is relied on to eliminate trouble due to amplitude modulation, the limiter itself should not cause any conversion of amplitude variations to phase variations.

The amplitude limiting systems of the prior art include, among others, simple overdriven amplifier stages, pentode amplifiers which employ a reduced conduction angle, and the use of simple nonlinear structures inserted in series with the line or in shunt with a wave translating device for amplitude limiting the applied signal when the amplitude of the applied wave exceeds a predetermined fixed level. Typical of the latter type are so-called plate type and cathode type limiters.

Plate type limiters heretofore proposed have conventionally comprised a vacuum tube amplifier with a pair of oppositely-poled asymmetrically-conducting devices connected between the plate circuit of the amplifier and a fixed reference voltage, usually ground. The amount of limiting obtainable with a single stage of the type described is, however, restricted because of an undesirable voltage rise appearing in the output signal due to the finite forward resistance of the asymmetrically-conducting devices. Additionally, level-to-phase conversion is produced by these limiters. The major portion of the work directed to improving this situation has been along the lines of improving the asymmetrically-conducting devices themselves. Notably, p-n junction diodes have been used, but stray capacity effects present have impeded this line of endeavor.

In accordance with the present invention, an amplitude control system which overcomes the disadvantages and limitations of the prior art comprises a wave translating means adapted to have applied thereto input signals which are subject to undesirable amplitude variations. The translating means has an output circuit and means connected to the output circuit for limiting the amplitude variations of the output signal of the translating means, and additional means for applying to the limiting means a portion of the input signal to control its limiting action.

In a preferred embodiment of the invention, a single stage plate type limiter utilizing a pair of oppositely-poled asymmetrically-conducting devices is made to provide an increased amount of suppression by use of a nonlinear compensation voltage derived from the input signal. The usual slight rise in output voltage with an increase in input, due to the resistance characteristic of the diodes, is effectively cancelled out by supplying a bias signal of proper phase and magnitude to the lower common diode connection. In addition, a nonlinear feedback signal derived from the diode output is fed back and combined with the input signal to give an improved level-to-phase characteristic to the limiter.

It should be understood that in the present application the term "asymmetrically-conducting device" refers to any of the well-known devices which present a relatively low impedance to an applied voltage of one polarity and a very high impedance, i. e., many times the low impedance, to an applied voltage of opposite polarity, so that they permit substantial conduction in but one direction therethrough. Such devices are well known in the art and include, for example, germanium crystal rectifiers. In the drawings, the usual convention is employed in which the direction of the arrowhead symbol indicates the low impedance direction of positive current flow.

The novel features that are considered characteristic of this invention are set forth with particularity in the appended claims. The invention itself, however, with additional objects and advantages thereof, will best be understood from the following description when read in conjunction with the accompanying drawings. In the drawings:

Insofar as possible, like elements of different drawings are indicated by the same or similar reference numerals.

Figure 1:
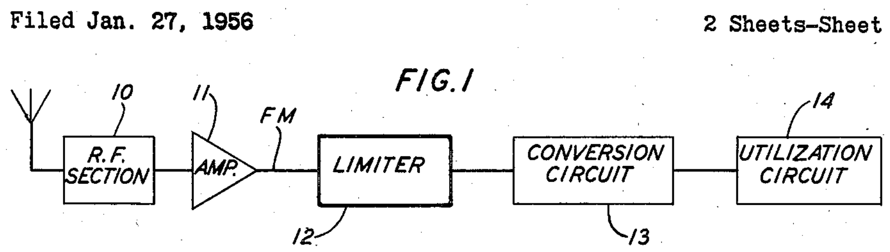
Fig. 1 is a block schematic drawing to show the type of system to which the invention is particularly applicable and its relation to the other parts of the system.

Considering now the drawings in detail, Fig. 1 shows the conventional arrangement of parts for a radio receiver for frequency modulated waves. This includes the radio receiver or radio frequency portion of the circuit 10 which may include a heterodyne detector for stepping the frequency down to an intermediate value, followed by amplifier 11, limiter 12, conversion circuit 13, and utilization circuit 14. It is to be understood that the utilization circuit 14 may include an indicating device such as a loudspeaker, or alternatively, a transmitter, and antenna system for use in radio repeater applications. The limiter 12 is shown in heavy outline indicating that this is the portion of the system to which this invention is directed.

Figure 2:
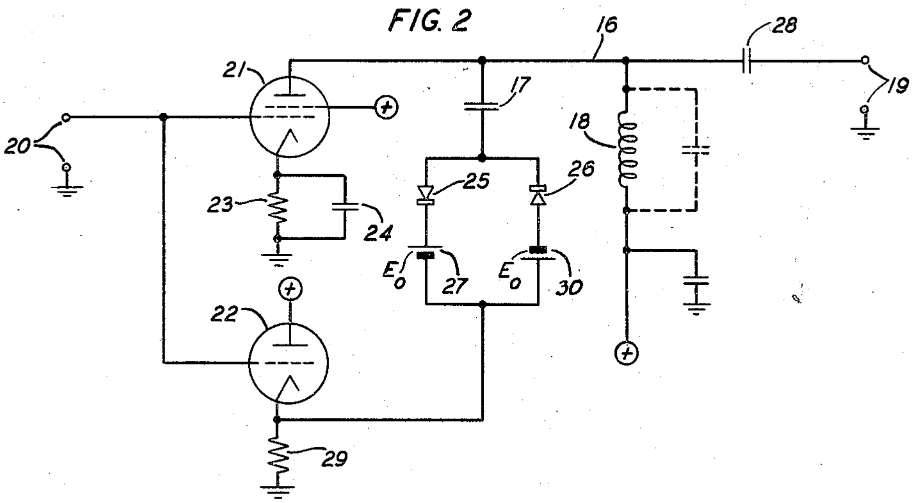
Fig. 2 is a simplified schematic drawing which illustrates one feature of the present invention in which nonlinear compensation is obtained from a cathode follower amplifier.

To improve the smoothing obtainable in a single stage plate type limiter, the use of a novel compensating circuit as shown in Fig. 2 is suggested. The compensated limiter is shown as comprising two vacuum tube stages 21 and 22. Both stages have the frequency modulated intermediate frequency signals from amplifier 11 impressed upon their grids by way of input terminals 20. Tube 21 is a conventional amplifier stage and may be typically a tetrode or pentode. The signal appearing in the plate circuit 16 of amplifier 21 is an amplified and inverted version of the input signal. A coupling capacitor 17 connects to the plate circuit 16 a pair of oppositely-poled biased diodes 25 and 26 shown together with their respective source of bias potential 27 and 30. In the limiters described in the prior art, the above-mentioned biased diodes are generally returned to a constant reference potential which is usually ground. In accordance with the present invention, however, the diodes are supplied with a variable voltage reference developed across the output resistor 29 of cathode follower 22. This voltage is an instantaneous replica of the input signal and occurs in phase inversion with respect to the signal appearing in plate circuit 16, thereby causing the threshold level and hence the clipping level of the diodes 25 and 26 to vary periodically with cyclic variations in the input signal. The advantage of this will be described in detail below with reference to Fig. 3.

Cathode follower 22, in addition to supplying a signal of the proper magnitude and phase relation across impedance 29 to cancel the usual slight rise in output as the input increases, effectively isolates the diode circuit from the input and thereby prevents feedback around amplifier 21. The properly limited signal present in lead 16 is coupled by means of capacitor 28 through output terminals 19 to conversion circuit 13.

Now assume that a frequency modulated signal containing undesirable amplitude variations is impressed on terminals 20, and further assume that vacuum tubes 21 and 22 are properly biased so that a replica of the input signal appears at the respective output terminals, i. e., across the cathode resistor 29 of tube 22, and in inverted and amplified form on plate lead 16. As has been mentioned, this former signal, containing the undesirable amplitude variations occurring cyclically with the excursions of the input wave, appears as an in-phase signal across resistor 29. Any of the means well known in the art may be utilized for initially establishing the voltage gain (necessarily less than unity) of cathode follower amplifier 22.

Considering once again the signal appearing in the output circuit 16 of amplifier 21, assume that the signal amplitude has been constant for a number of cycles at a voltage amplitude less than that supplied by bias supplies 27 and 30 to the pair of diodes 25 and 26 and that the bias is so adjusted that the diodes 25 and 26 maintain their respective high impedance characteristic for this value of signal. The impedance through which the plate current flows is then essentially the parallel combination of the plate resistance, reverse diode resistance, the stray capacity and inductance of coil 18 and the coil loss. This inductor is included to antiresonate with the stray capacity of the circuit. It is evident that an instantaneous signal increase will cause the voltage on lead 16 to increase and, eventually, a point will be reached at which the peak value of the signal exceeds the threshold point of the diodes and one or the other of the diodes will conduct in the forward direction, i. e., exhibit a relatively low dynamic impedance value and provide a much lower impedance path for that portion of the signal than the other shunt impedances. This shunt path comprises capacitor 17 which is relatively large, bias supplies 27 or 30, and impedance 29. The conducting diode acts to restrain the voltage on lead 16 from rising any higher.

It is obvious that perfect limiting would be achieved if the shunt path through the diode was of zero impedance. However, as heretofore mentioned, such a path has a finite impedance due to the well-known characteristics of asymmetrically-conducting devices and therefore gives rise to a voltage drop which adds to the average value of the output signal. In accordance with the invention such a rise in output is reduced by virtue of the variable voltage appearing across resistor 29 which is used to vary the bias applied to diodes 25 and 26. In the example under consideration wherein the instantaneous signal amplitude of one cycle has increased to the point at which one of the diodes conducts, an out-of-phase component of that same signal, applied in series with the shunt path previously described, effectively compensates for the rise in voltage due to the diode drop and thereby maintains the average output amplitude constant.

Figure 3:
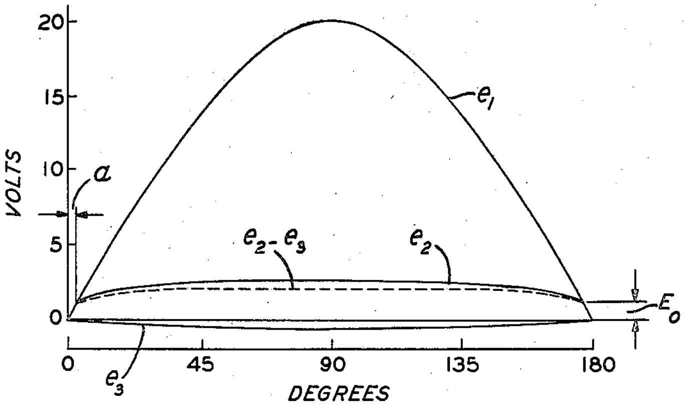
Fig. 3 shows graphically additional characteristics of Fig. 2.

This will be more easily understood by referring to Fig. 3 wherein the above-described conditions are represented in graphical form. In this graph, the abscissa represents time measured in electrical degrees and the ordinate represents voltage. One half-cycle of a typical unlimited wave $e_1$ having a peak amplitude of 20 volts is shown together with $e_2$, the same wave after uncompensated limiting. The voltage $E_0$ is taken to represent the bias voltage of source 27 during the first half-cycle of the wave $e_1$ and of source 30 during the other half of the cycle, it being understood that the second half-cycle of the curves of Fig. 3 would be identical to the first but of opposite phase. It is thus evident that the diode bias $E_0$ is overcome and limiting commences after angle $\alpha$. In the absence of diode resistance, the wave $e_2$ is constant at a value substantially equal to $E_0$, and with a finite fixed value of diode resistance, constant limiting at a voltage somewhat greater than this level results, the exact value being dependent upon the resistance exhibited by the diode.

As is well known in the art, however, the effective resistance of an asymmetrically-conducting device decreases with increasing drive voltage, and as a result the voltage drop occasioned by the diode resistance decreases with an increase in the applied wave. The uncompensated output wave $e_2$ therefore would have the nonlinear characteristic as shown by the curve except for the improvement provided by the present invention.

Figure 6:
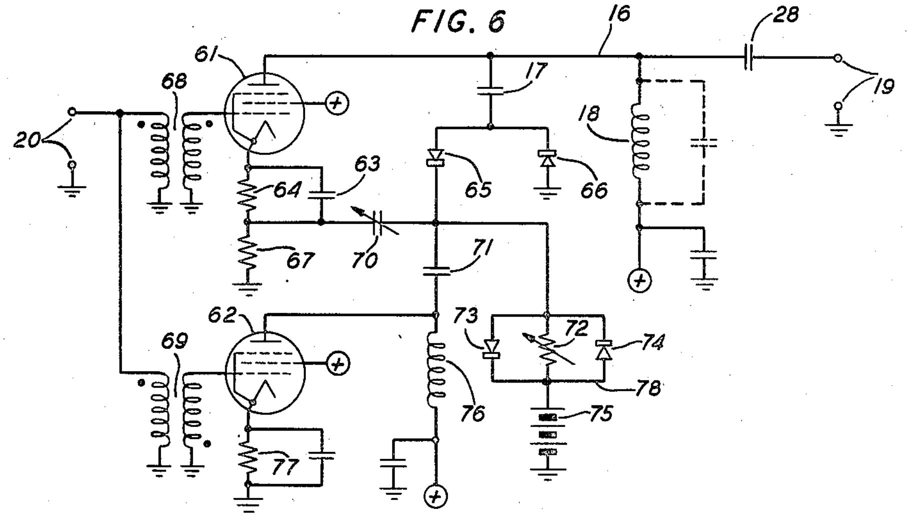
Fig. 6 is a schematic circuit diagram of an improved plate type amplitude limiter incorporating both nonlinear feedback and compensation in accordance with the invention.

In accordance with the invention, a voltage $e_3$ is obtained in an out-of-phase relationship with wave $e_2$ from the output of cathode follower 22 and is applied to the diode circuit as a compensating bias to effectively vary the threshold level of the diodes. This voltage changes at the same rate as $e_1$ at the normal operating level. As a result, operation is restricted to a narrow range and the resultant output wave exhibits a greatly improved characteristic as shown by the curve $e_2$–$e_3$. It is obvious that cancellation may be made complete at the normal operating level by suitable adjustment but will, of course, be less than perfect at levels above and below this level. Fig. 6, described in detail below, represents an embodiment which gives substantially complete cancellation at all levels.

Figure 4:
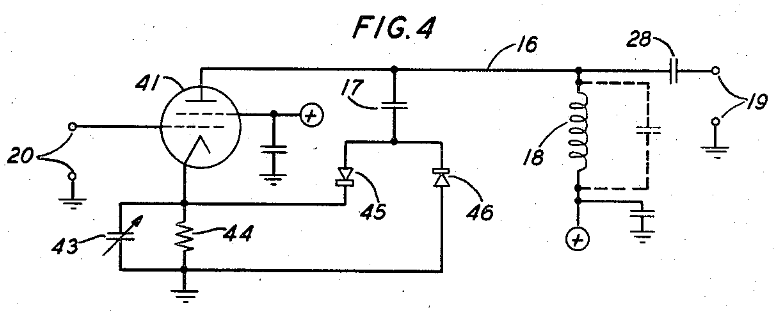
Fig. 4 is a schematic drawing of a limiter circuit embodying the invention and in which nonlinear compensation is derived from the cathode circuit of an amplifier stage.

A somewhat different form of the invention is shown in Fig. 4, to which reference will now be made. As before, the frequency modulated signal output of amplifier 11 is impressed on terminals 20 of amplifier 41, and an inverted version of the signal appears in output lead 16 subject to the limiting action of asymmetrically-conducting devices 45 and 46. It will be noted that, in the present embodiment of the invention, the compensating voltage is no longer derived from a separate source but is obtained from the cathode circuit of tube 41. Inasmuch as the signal voltage appearing across cathode resistor 44, neglecting for the moment the effect of capacitor 43, will be an in-phase signal, it can be properly utilized for compensation. However, resistor 44, which is connected in series with the amplifier output load, is also connected in series with the grid circuit so that the output voltage that appears across resistor 44 is in series with the signal voltage. This feedback tends to make for instability in the limiting action but it has been found that the detrimental effects of feedback can be effectively reduced by lowering the plate voltage so as to increase the screen interception ratio. By this expedient, the cathode voltage becomes more dependent on screen current and less on plate current. A further reduction of the detrimental feedback effects can be made by bypassing the cathode resistor 44 with a small capacitor 43.

It has been found convenient to provide the direct-current bias for the limiter diodes from the same cathode resistor. Thus, the voltage developed by the total space current flowing through resistor 44 replaces the fixed battery sources of Fig. 2.

Figure 5:
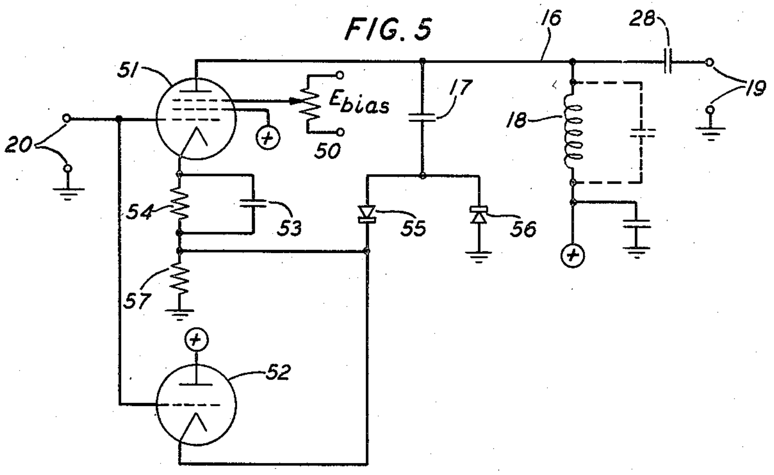
Fig. 5 shows in schematic diagram form an embodiment in accordance with the present invention for providing both nonlinear compensation and nonlinear feedback.

As heretofore mentioned, a wide band amplitude limiter for use in high gain circuits must have substantially reduced level-to-phase conversion in order to prevent distortion. Inasmuch as the effective shunting resistance of a plate limiter decreases with increasing drive, the phase of the signal will be shifted less at high levels than at low levels. Fig. 5 is a schematic circuit drawing of an embodiment of the present invention which combines the nonlinear compensation, previously described, with nonlinear feedback for minimizing this nonlinear phase shift. In the drawing, the frequency modulated intermediate frequency waves from amplifier 11 are impressed on the terminals 20. As in Fig. 2, the limiter comprises two vacuum tube stages 51 and 52 and, as before, amplifying stage 51 may be typically a tetrode or pentode. As described in connection with Fig. 4, the space current of amplifier 51 flowing through cathode resistor 57 may be utilized to provide the necessary compensation as well as the bias for the limiting devices 55 and 56. The magnitude of this current may be controlled, for example, by varying the suppressor grid bias potential by means of potentiometer 50 connected across a bias voltage source E. Alternatively, a separate bias source may be provided and an additional source of compensation may be employed.

In the embodiment of Fig. 5, compensation in addition to that resulting from the flow of current through the cathode resistance 57 is supplied by cathode follower 52. The direct-current bias for the diodes is supplied by the total space current flowing through the common cathode resistor 57. As can be seen, negative feedback is introduced by virtue of the current flowing through resistor 57. It is apparent that this feedback is nonlinear, that is to say, it varies with signal value. By adjusting the relative space currents of the two tubes as well as the magnitude of resistor 57, it is possible to separately optimize both compensation and feedback.

As mentioned above, the compensating voltage $e_3$ of Fig. 3 is a linear function of $e_1$ and as a result, the output limited signal $e_2$–$e_3$ falls off at above normal operating levels. Obviously, it is desirable to have $e_3$ "track" $e_2$ so that their difference, the output signal, is constant. This result may be accomplished by including a pair of auxiliary diodes in the output of the compensation stage. Fig. 6 shows a novel extension, in accordance with the invention of the compensated limiter of Fig. 5 in which such a tracking circuit is included for reducing overcompensation effects which might occur at greater than normal operating levels. While a cathode follower stage for supplying the compensation voltage would be operative, the preferred embodiment utilizes a tetrode or pentode amplifying stage 62 to supply an amplified compensating signal which is of sufficient magnitude to allow for losses incurred in tracking circuit 78. This tracking circuit, comprising for example resistor 72 and the asymmetrically-conducting devices 73 and 74, may be of any conventional type for linearity correction. As illustrated, diodes 73 and 74 are driven by tube 62 in opposite phase relationship to the main limiter diodes 65 and 66 and at substantially zero bias to provide a compensating voltage with approximately the correct amount of nonlinearity at greater than normal operating levels.

The input transformers 68 and 69 are so arranged that the signals appearing in the plate circuits of tubes 61 and 62 are out of phase. This is indicated schematically by the dot notation used in connection with the windings of transformers 68 and 69; dots located at the same end of the windings indicating an in-phase relationship, and dots located at opposite ends denoting a phase inversion. It is to be understood, however, that transformers 68 and 69 are included only by way of illustration, and any arrangement for providing the necessary phase inversion may be used.

The compensating signal output of tube 62 is coupled through capacitor 71 to the diodes 65 and 66 and, as before, compensates for a rise of voltage across these diodes in the presence of a signal. Voltage source 75 is coupled through the tracking network 78 to provide the bias voltage for diodes 65 and 66. The diode limiting network is connected via capacitor 17 to the plate circuit 16 of tube 61 which is coupled through capacitor 28 to output terminals 19 and thence to conversion stage 13. In order to minimize level-to-phase conversion, a portion of the signal appearing at the junction of diode 65 and capacitor 71 is fed back through capacitor 70 to the cathode circuit of tube 61. This signal appears across resistor 67 and thereby increases the amount of feedback already present and effectively controls the space current flowing through tube 61. By varying the value of resistor 72, the amount of compensation voltage may be regulated, and by varying the value of coupling capacitor 70, the amount of feedback can be controlled.

It is seen from the foregoing description of a number of illustrative embodiments of the invention that there is provided a relatively simple apparatus by means of which the output voltage of an electrical amplifier is effectively limited. Furthermore, it is apparent from the foregoing description that an increased amount of suppression in a single stage of limiting is achieved together with the additional advantage of a substantial reduction of extraneous level-to-phase conversion.

Although the invention has been described with reference to particular illustrative embodiments, other embodiments and modifications within the spirit and scope of the invention will readily occur to one skilled in the art.

What is claimed is:

1. In combination, a source of signals subject to undesired amplitude variations, means for reducing said variations comprising a wave translating circuit having an input and an output, means for applying said signals to said circuit input, asymmetrically-conducting means shunting said circuit output, means included in said wave translating circuit for establishing a threshold level of conduction for said asymmetrically-conducting means, cathode follower means supplied with said signals for applying to said asymmetrically-conducting means an in-phase portion of said input signal thereby to alter continuously said pre-established threshold level in accordance with cyclic level changes in said input signals, and means for varying the degree of alteration of said threshold level.

2. An amplitude limiting system comprising, in combination, a first amplifying element having at least an anode, a control grid to which may be applied input signals subject to undesirable amplitude variations, and a cathode, an anode-cathode circuit which includes in series a low impedance across which is developed an output signal, a source of direct potential, and a cathode impedance across which is developed a voltage, means including a pair of oppositely-poled asymmetrically-conducting devices connected to said amplifier anode for limiting the amplitude variations of said output signal, means for applying the voltage developed across said cathode impedance to said asymmetrically-conducting devices for establishing a threshold level of conduction, a second amplifying element having at least an anode, a control electrode supplied with said input signals and a cathode, a cathode impedance across which is developed a voltage, means for applying the voltage developed across said last-mentioned impedance to said asymmetrically-conducting devices for altering the threshold of conduction in accordance with amplitude variations in said input signal, and means for adjusting the relative space currents of said first and said second amplifying elements.

3. An amplitude limiting system comprising, in combination, a first and a second amplifying element each having at least an anode, a control grid to which may be applied signals, and a cathode, an anode-cathode circuit associated with said first said amplifying element which includes in series a low impedance across which is developed an output signal, a source of direct potential, and a pair of series connected cathode impedances, an anode-cathode circuit associated with said second amplifying element which includes in series a source of direct potential and one of said pair of cathode impedances associated with said first amplifying element, means connected to each of said control grids for supplying thereto input signals subject to undesirable amplitude variations, means for limiting the amplitude variations of the output signals derived from said first amplifying element, said means comprising a pair of oppositely-poled diodes having their common terminals coupled capacitively to said anode of said first amplifying element and having one of their other terminals connected to a point of negative potential in said source of potential associated with said first amplifying element, and means for coupling the output signal produced by virtue of the total space current of said first and of second amplifying elements flowing through said one cathode impedance of said first amplifying element to the other terminal of said pair of diodes both for biasing said diodes to a predetermined threshold value of conduction and for altering said threshold value in accordance with said input signal variations.

4. An amplitude limiting system comprising, in combination, a source of signals subject to undesired amplitude variations, a first amplifying element having at least an anode, a control grid, and a cathode, means supplying said signals to said control grid, an anode-cathode circuit which includes in series a load impedance across which is developed an output signal, a source of direct potential, and a cathode impedance, means including a pair of oppositely-poled asymmetrically-conducting devices connected to said amplifying element anode for limiting the amplitude variations of said output signal, a source of direct current for biasing said asymmetrically-conducting devices to a predetermined level, means including a second amplifying element supplying an in-phase portion of said input signal to said limiting means for controlling the action of said limiting means, and feedback means connected between said second amplifying element output and the cathode circuit of said first amplifying element.

5. An amplitude limiting system comprising, in combination, a first and second amplifying element each having at least an anode, a control grid and a cathode, an anode-cathode circuit associated with said first amplifying element which includes in series a load impedance across which is developed an output signal, a source of direct potential, and a cathode impedance, an input terminal to which may be applied input signals subject to undesirable amplitude variations, means connected between said input terminal and each of said control grids for supplying thereto the input signal of the proper phase relationship to result in amplified out-of-phase signals being produced at the two said output impedances, means including a pair of oppositely-poled asymmetrically-conducting devices having their common terminals coupled capacitively to said anode of said first amplifying element and having their other terminals connected respectively to ground and a source of positive biasing potential for limiting the amplitude variations of said first amplifying element output signal, means for capacitively coupling a portion of the output signal of said second amplifying element to the junction between said biasing source and said asymmetrically-conducting device for controlling the action of said limiting means in accordance with said input signal, and feedback means connected between said junction and said first amplifying element cathode for reducing the level-to-phase conversion of said first amplifying element.

6. In combination, a source of input signal waves subject to undesirable amplitude variations, means for reducing said variations comprising a first wave translating circuit, means for applying said input waves to said circuit, a pair of oppositely-poled asymmetrically-conductive impedance means shunting the output of said circuit, said asymmetrically-conductive impedance means characterized by a high impedance for applied signal waves below a threshold level and a nonlinear low impedance above said threshold level, means for deriving from said first wave translating circuit an output signal, means for deriving from said first wave translating circuit a signal component in-phase with said input signal waves, means including a second wave translating circuit for deriving from said source of input signal waves an instantaneous in-phase replica of the input wave variations, means for applying to said asymmetrically-conductive impedance means both said in-phase signal component derived from said first wave translating circuit and said instantaneous replica of said input signal waves derived from said second wave translating circuit to establish therein a predetermined threshold level of conduction in the absence of input signal wave variations, and to vary continuously said predetermined threshold level in accordance with input signal variations, thereby to compensate for the cyclic increase in impedance of said asymmetrically-conductive impedance means with variations in the input signal amplitude, and means for adjusting the relative space currents of said first wave translating circuit and said second wave translating circuit thereby to achieve optimum compensation over a wide range of amplitude variations of said input signal.

References Cited in the file of this patent

UNITED STATES PATENTS

| | | |
|---|---|---|
| 2,171,671 | Percival | Sept. 5, 1939 |
| 2,215,777 | Benz | Sept. 24, 1940 |
| 2,299,945 | Wendt | Oct. 27, 1942 |
| 2,329,558 | Scherbatskoy | Sept. 14, 1943 |
| 2,362,503 | Scott | Nov. 14, 1944 |
| 2,390,503 | Atkins | Dec. 11, 1945 |
| 2,466,959 | Moore | Apr. 12, 1949 |
| 2,512,637 | Frazier | June 27, 1950 |

FOREIGN PATENTS

| | | |
|---|---|---|
| 427,941 | Great Britain | May 2, 1935 |